United States Patent [19]
Delfino

[11] 4,381,098
[45] Apr. 26, 1983

[54] CERAMIC BELT BUCKLE AND THE METHOD OF MAKING

[76] Inventor: Nicholas A. Delfino, 2403 Antigua Cir., Coconut Creek, Fla. 33066

[21] Appl. No.: 207,967

[22] Filed: Nov. 18, 1980

[51] Int. Cl.³ ........................ B29C 6/00
[52] U.S. Cl. ........................ 249/94; 249/160
[58] Field of Search ........................ 249/83, 91, 93, 94, 249/95, 96, 160; 425/180, 195, DIG. 44, DIG. 124

[56] References Cited

U.S. PATENT DOCUMENTS

| | | | |
|---|---|---|---|
| 909,487 | 1/1909 | Wallace | 249/91 |
| 974,024 | 10/1910 | Carter | 249/91 X |
| 2,188,415 | 1/1940 | Malsch | 425/180 |
| 2,326,271 | 8/1943 | Wessinger | 425/180 X |
| 2,328,285 | 8/1943 | MacDougall | 425/180 X |
| 2,482,239 | 9/1949 | Botivinick | 249/95 X |
| 2,582,022 | 1/1952 | Feldman et al. | 249/95 |
| 2,628,375 | 2/1953 | Smithson | 425/175 X |
| 2,643,418 | 6/1953 | Auldridge | 249/95 X |
| 3,026,146 | 3/1962 | Szabo et al. | 249/96 X |
| 3,712,575 | 1/1973 | Bernent et al. | 249/91 |
| 3,889,918 | 6/1975 | Stoeberl | 249/96 X |
| 4,260,575 | 4/1981 | Pollard | 249/95 X |
| 4,348,003 | 9/1982 | Beneteau | 249/96 |

*Primary Examiner*—J. Howard Flint, Jr.

[57] ABSTRACT

A molded, ceramic belt buckle including a molded ceramic body and integrally molded metal alloy eyes and a belt hook, and the method and mold for forming the ceramic greenware. A sequentially operated, six piece mold is employed to form the ceramic greenware in the desired belt buckle shape, including the metal alloy eyes (that fasten the belt harness) and a belt hook. The ceramic greenware is fired in a kiln to form a ceramic bisque that is ready for decoration. A specially shaped harness is coupled to the eyes for attachment to a belt. The belt buckle shaped ceramic bisque can receive secondary molding for individualized styling such as the addition of a particular name.

2 Claims, 11 Drawing Figures

CERAMIC BELT BUCKLE AND THE METHOD OF MAKING

BACKGROUND OF THE INVENTION

This invention relates to a ceramic belt buckle, and the method and the mold for making said belt buckle.

Conventional belt buckles which are usually made from metal tend to rust and tarnish. Painted decorations peel and wear. The dies necessary to punch out shapes or specific designs prohibit individualized custom decorations by the purchaser since the basic belt buckle is stamped at the factory. Thus, the selection of belt buckles available to the general public is greatly limited. Repair to a damaged metal belt buckle is not feasible for the consumer.

The present invention overcomes the above limitations by providing a belt buckle in which the main body is formed from a ceramic molded material. However, metal harness fasteners and a metal hook are integrally formed into the ceramic body in accordance with the teachings of the invention. The advantage of the ceramic belt buckle is that it does not rust or tarnish. Further, painted decorations can be fired firmly to the ceramic material to prevent premature peeling. The cost of individualized decorative additions using ceramic molding techniques is greatly reduced in that an individual customer can purchase a basic formed ceramic belt buckle and at a very low cost have his own individualized name, logo or the like easily affixed thereto. The ceramic material is also useful and ideal for metallic coatings which can be fired on the material to give the appearance of a metallic belt buckle if desired. Because of the nature of the ceramic material employed, the belt buckle can be easily and inexpensively repaired by the consumer.

The present invention also discloses a unique molding technique which is essential for the production of the belt buckle in which the ceramic body is uniformly molded while including metal fasteners necessary for the operation of the belt buckle.

BRIEF SUMMARY OF THE INVENTION

A belt buckle comprising a ceramic body, and including a pair of metal harness fasteners partially embedded and firmly anchored in said ceramic body, and a metal alloy belt hook partially submerged and firmly anchored in said ceramic body. A durable metal harness is subsequently attached to the eyes, after molding and firing of the ceramic body. The invention also includes the method of making said ceramically formed belt buckle incorporating the metal alloy fasteners and hook. The invention further includes the unique mold utilized in the invention which gives the ceramic belt buckle its shape and simultaneously firmly anchors the metal fasteners and hooks within the ceramic body during the initial molding of the greenware. The molding technique includes the use of two half mold cavities, which include a lower single piece base mold cavity and five pieces that together form an upper mold cavity, each upper piece being uniquely shaped so that the user must sequentially remove specific pieces in a predetermined order of priority in order for the invention to be properly utilized. Among other things, the upper mold cavity pieces, when properly positioned for the molding process to receive the slip for forming the greenware, support and fix in position, two metal alloy eyes, the stems of which are partially submerged in the slip and a metal alloy belt buckle hook which is also partially submerged in the slip and fixed by the mold during the greenware forming process.

Once the greenware is formed in the desired belt buckle shape as provided when the upper and lower mold cavities are united with the metal fasteners and hooks firmly anchored therein, the mold pieces are removed in the proper sequence to prevent damage to the greenware and the fasteners and hooks disposed therein.

The greenware is then fired in a kiln with temperatures up to 2500 degrees to form the ceramic bisque. Note that the metal alloys are selected so that they will not become burned during the kiln operation. Applicant has determined that nicrome or an equivalent material is necessary for the metal fasteners and metal hooks.

After the firing in the kiln, the ceramic belt buckle can then be additionally decorated with individualized emblems, logos, persons names, with a very minor ceramic molding operation that is added onto the final product.

The metal harness is affixed to the eyes mechanically using a tool that compresses each side of the harness simultaneously forcing the harness ends to be positioned such that the harness will not separate from the eye fasteners. The harness is specially shaped (concave across its mid-section) to provide proper end spacing during attachment relative to the eyes. The concavity is removed during attachment so that after application, the harness ends can not slide through the eyes.

It is a principal object of the present invention to provide a method whereby a belt buckle can be made of economical ceramic material and combined with metal alloys in an integral, rigid unit.

It is another object of this invention to provide a belt buckle that can be utilized as fine, fashionable jewelry, decorated in economical liquid gold platen or other metallic appearing materials.

And yet another object of this invention is to provide a belt buckle that is simple in construction and design, inexpensive to manufacture, rugged and durable, easy to use and which includes an endless choice of colors, and decorative designs at low cost.

And still yet another object of this invention is to provide a unique mold that is sequentially actuated to form a specific belt buckle having metal alloy fasteners and hooks integrally embedded therein.

In accordance with these and other objects which will be apparent hereinafter, the instant invention will now be described with particular reference to the accompanying drawings.

PREFERRED EMBODIMENT OF THE INVENTION

Figure 1:
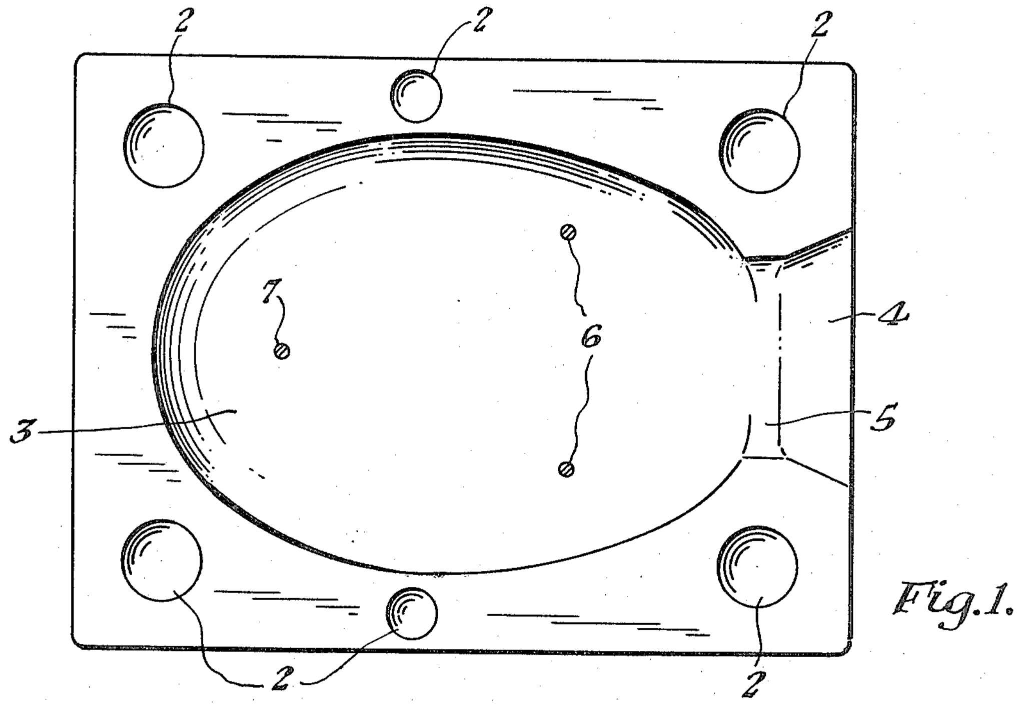
FIG. 1 shows a top plan view of the base mold utilized in the present invention.

Referring now to the drawings and specifically FIG. 1, a top plan view of the lower section of the mold is shown and includes a plaster of paris mold body 1 having a cavity 3 which is used to form part of the belt buckle body by the admission of ceramic slip through opening 4 and neck portion 5 into the cavity 3. Additional key holes 2 are provided around the molding cavity 3 to insure proper alignment between the upper pieces of the mold which are described below and the base piece 1 shown. The mold includes additional locating slots for locating the metal hook 7 and a pair of metal alloy eyes 6 which will be submerged into the slip during the molding operation.

Figure 2:
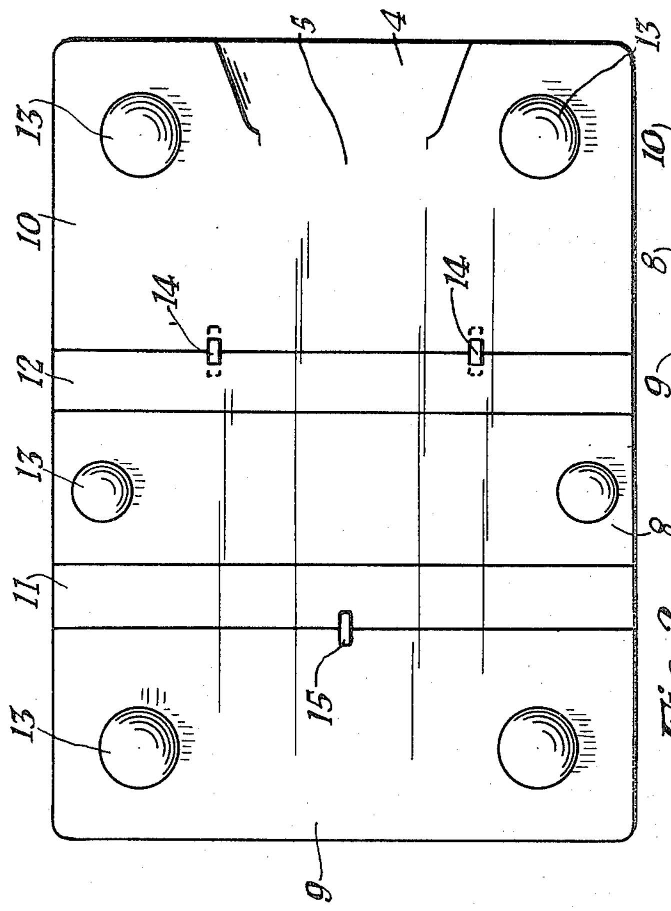
FIG. 2 shows a bottom plan view of the upper mold section utilized in the present invention.

FIG. 2 shows the upper half of the mold which consists of five separate mold body pieces, elements 8, 9, 10, 11, and 12, and projecting keys 13 which are alignable with key holes 2 shown in FIG. 1 for proper alignment of the mold pieces.

The upper five piece half of the mold (elements 8 through 12) include locating slots into which are positioned a pair of harness attaching eyes 14 and a metal hook 15 which hold the eyes and the hook firmly in position, suspending them so that a portion of them are embedded in the slip material during the mold forming process.

Figure 3:
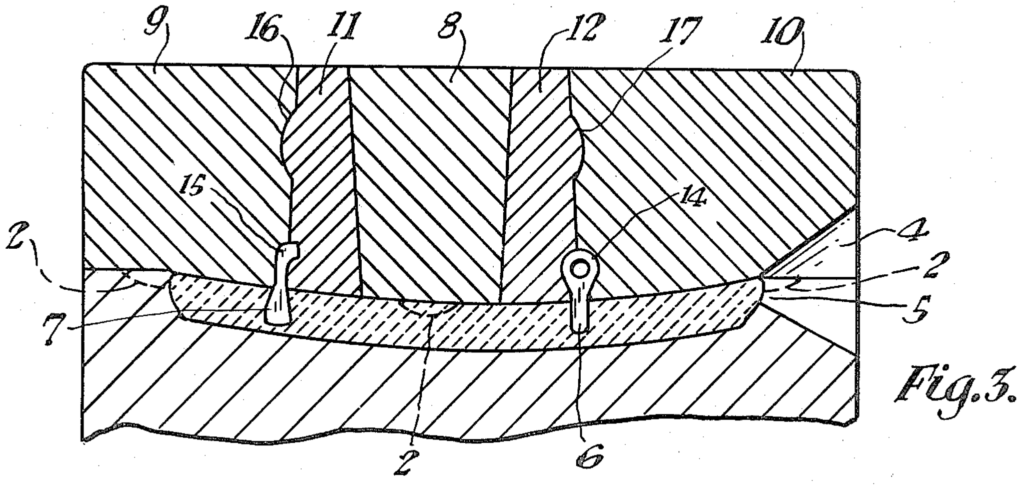
FIG. 3 shows a side elevational view in cross-section of the mold utilized in the present invention.
Figure 4:
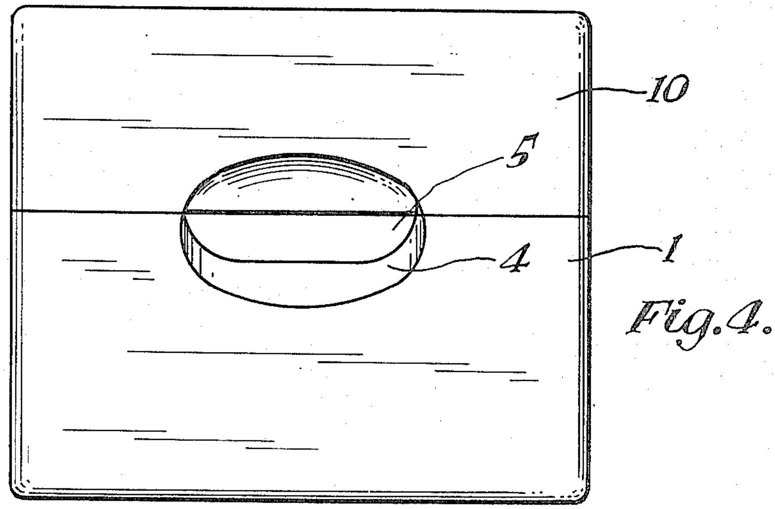
FIG. 4 shows an end elevational view showing the mouth and neck opening of the mold utilized in the present invention.

FIG. 3 shows the upper portion of the hook 15 in the locator passage between mold pieces 9 and 12 and one eye having a separate portion 14 located between mold pieces 10 and 11 with the base portion 6 being submerged in the cavity 3.

FIG. 3 also shows additional protrusions 16 and 17 and mold pieces 12 and 11 respectively which act as keys to prevent vertical movement of pieces 12 and 11 relative to outside pieces 9 and 10. This coupled with the fact that center piece 8 is tapered allows a firm and rigid holding together of all five of the upper pieces of the mold during the molding process.

Figure 5B:
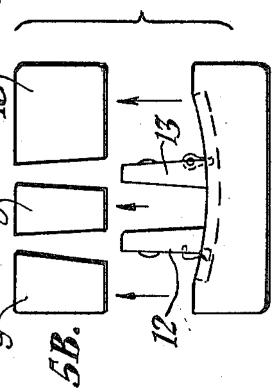
FIGS. 5*a*, 5*b* and 5*c* show a schematic representation of the sequential operation of the mold and a graphic representation of the different shapes of the mold pieces.
Figure 5C:
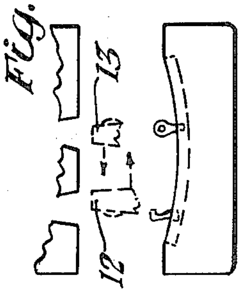
Figure 5A:
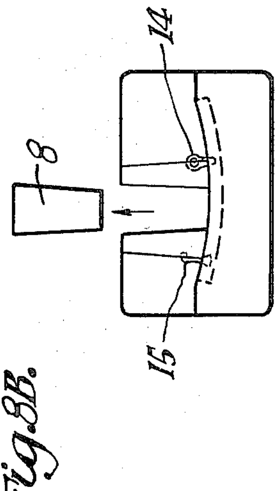

FIG. 3 shows the mold in a condition that is ready to receive slips through mouth 4 and the neck opening 5 which is poured directly into the cavity 3. FIGS. 5*a* and 5*b* and 5*c* show the release of the upper mold pieces when the ceramic slips in cavity 3 have set. The center piece 8 is the first to be removed and this can be done because of its tapered shape relative to the adjacent pieces 11 and 12. The next pieces removed are the end pieces 9 and 10 which allow exposure of the hook and eyes at that time. The final pieces to be removed which must be removed laterally rather than vertically are pieces 11 and 12 which directly abut the hook and eye. The proper movement of the mold pieces prevent damage to the ceramic material and the hook and eyes embedded therein and is essential for the operation of the invention. Any other type of mold would damage the embedded metal fasteners and hooks, making the construction of the belt buckle impractical.

Once the upper mold pieces are removed, the ceramic greenware thus formed, including the hooks integrally molded therein, is removed from the mold, polished, cured and then placed in a suitable kiln for firing. After the firing process, the ceramic bisque can then be suitably decorated with appropriate coatings or may have additional molding such that a particular name, logo, or emblem could be added by the consumer at a very low cost. Thus the ceramic bisque could be sold to the consumer who could himself add individualized styling or decorations to the ceramic bisque or the ceramic bisque could be additionally coated or treated for final sale to the consumer at the manufacturing site. This is one of the tremendous advantages of the invention in that an individual consumer can take the basic ceramic bisque belt buckle and himself apply the individualized styling desired onto the ceramic bisque.

Figure 6:
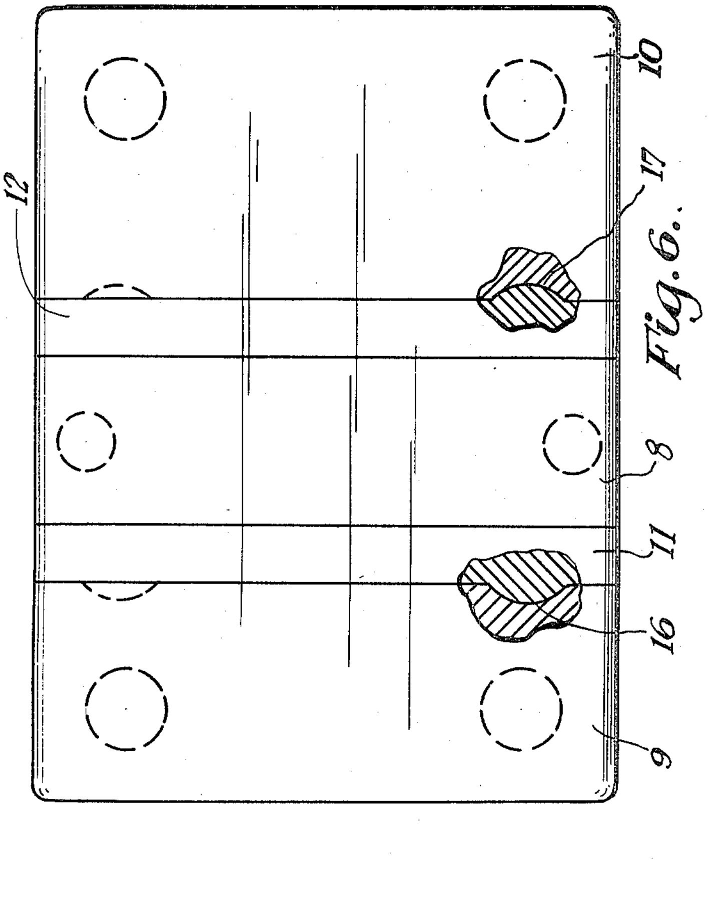
FIG. 6 shows a top plan view of the upper portion of the mold partially cut away.

FIG. 6 shows a top view of the mold and includes the keys 16 and 17 disposed between mold pieces 9 and 12 and 11 and 10.

Figure 7:
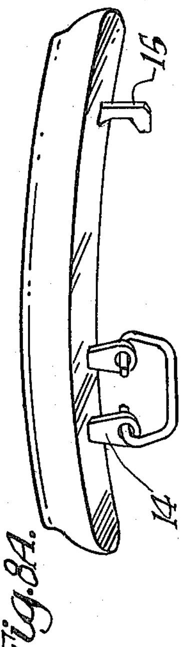
FIG. 7 shows a perspective view of a belt buckle made in accordance with the present invention.

FIG. 7 shows a suitably formed ceramic bisque belt buckle 18 which includes a pair of metal alloy eyes firmly anchored in the ceramic bisque body and a metal hook also firmly anchored in the ceramic bisque body. The eyes are used for attachment to a metal harness which is itself affixed to the belt end. The hook is receivable into holes in the belt to achieve buckling.

Figure 8B:
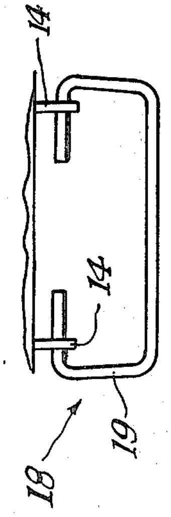
FIGS. 8*a* and 8*b* show a front elevational view of the harness utilized with the present invention prior to and after its installation on the belt buckle.
Figure 8A:
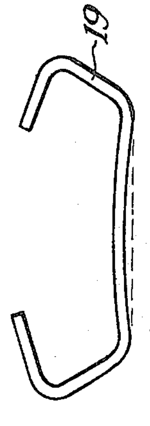

FIGS. 8*a* and 8*b* show the harness which is attached after the ceramic bisque has been removed from the kilm. FIG. 8*a* shows the shape of the harness before it is mechanically attached between the pair of eyes firmly anchored in the buckle body. Note that the mid-portion is concave and the ends point downwardly at an angular relationship to each other. FIG. 8*b* shows the shape of the harness after the ends have been positioned in the eyes and the sides of the harness firmly squeezed together by a tool which causes the concavity to disappear during the deflammation and the end tips to become essentially colinear, each having its axis along the same axis. The unique shape, prior to its installation of the harness, ensures that the harness end can fit and slide into the eyes and once the sides are compressed together, the harness ends will not be able to be removed from the belt buckle. This ensures a firm fit of the harness. The harness is then affixed to the free end of the belt so that the belt buckle is then firmly attached to the belt.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A mold for forming a belt buckle having a ceramic bisque body in any desired shape and for integrally molding therein a metal harness connector and a metal belt buckle hook firmly embedded therein, said molding comprising:
   - a base mold segment having a cavity therein;
   - a plurality of upper mold segments forming the top half of the mold which fit together to form the upper half of the mold, said segments having abutting wall portions that include cavities for supporting said metal connectors and said metal hook, said upper mold wall segments being shaped relative to each other for sequential removal to prevent damage to said ceramic greenware formed therein.

2. A mold as in claim 1 wherein: said plurality of upper mold segments includes five segments, the middle segment being tapered on its side, a pair of adjacent segments that are tapered to fit against said center piece allowing it to be removed from said two adjacent pieces and a pair of end pieces which include a key surface configuration for locking the end surfaces to the adjacent surfaces.

* * * * *